(12) United States Patent
Yamazaki et al.

(10) Patent No.: US 12,175,873 B2
(45) Date of Patent: Dec. 24, 2024

(54) FLIGHT MANAGEMENT SYSTEM AND FLIGHT MANAGEMENT METHOD

(71) Applicant: KDDI CORPORATION, Tokyo (JP)

(72) Inventors: Sou Yamazaki, Tokyo (JP); Takaya Tanaka, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 18/487,353

(22) Filed: Oct. 16, 2023

(65) Prior Publication Data

US 2024/0046802 A1 Feb. 8, 2024

Related U.S. Application Data

(63) Continuation of application No. 17/411,631, filed on Aug. 25, 2021, now Pat. No. 11,823,579.

(30) Foreign Application Priority Data

Dec. 24, 2020 (JP) ................... 2020-214790

(51) Int. Cl.
*G08G 5/00* (2006.01)
*G06Q 30/0283* (2023.01)
(Continued)

(52) U.S. Cl.
CPC ......... *G08G 5/003* (2013.01); *G06Q 30/0284* (2013.01); *G07C 5/008* (2013.01);
(Continued)

(58) Field of Classification Search
CPC ....... G08G 5/003; G08G 5/006; G08G 5/0069
(Continued)

(56) References Cited

U.S. PATENT DOCUMENTS

2015/0280812 A1 10/2015 Jalali
2019/0236966 A1* 8/2019 Borgyos ............... G08G 5/0069
(Continued)

FOREIGN PATENT DOCUMENTS

JP A2014-053821 3/2014
JP A-2019-021975 2/2019
(Continued)

OTHER PUBLICATIONS

JP Office Action in JP case Appl. Ser. No. 2022-076905 dated Sep. 13, 2022 (9 pages) (9 pages).
(Continued)

*Primary Examiner* — Isaac G Smith
(74) *Attorney, Agent, or Firm* — Foley & Lardner LLP

(57) ABSTRACT

A flight management system is configured to manage the flight of a flight vehicle in communication with a user terminal operated by a user. The flight management system includes a receiver configured to receive from the user terminal the flight application information including the identification information of the flight vehicle, a flight path preferred by the user, and a flight time preferred by the user; a determination unit configured to determine whether or not to permit utilization of predetermined radio waves with the flight vehicle to fly along the flight path at the flight time based on the flight application information; and a transmitter configured to transmit the flight information instructing the flight vehicle to fly along the flight path to the flight vehicle identified by the identification information on the condition that the determination unit determines to permit utilization of predetermined radio waves.

10 Claims, 4 Drawing Sheets

(51) Int. Cl.
*G07C 5/00* (2006.01)
*G07C 5/08* (2006.01)

(52) U.S. Cl.
CPC .......... *G07C 5/0808* (2013.01); *G08G 5/006* (2013.01); *G08G 5/0069* (2013.01)

(58) Field of Classification Search
USPC ........................................................... 701/3
See application file for complete search history.

(56) References Cited

U.S. PATENT DOCUMENTS

| | | | |
|---|---|---|---|
| 2020/0266903 A1 | 8/2020 | De Rosa et al. | |
| 2020/0317335 A1 | 10/2020 | Sugaya | |
| 2021/0103294 A1* | 4/2021 | Mahkonen | H04W 28/0268 |
| 2021/0345214 A1 | 11/2021 | Poscher et al. | |
| 2021/0356953 A1* | 11/2021 | Zavesky | G06V 20/20 |
| 2022/0070792 A1* | 3/2022 | Lekutai | H04W 52/285 |

FOREIGN PATENT DOCUMENTS

| | | |
|---|---|---|
| JP | 2019-121405 A | 7/2019 |
| JP | 2020-030104 A | 2/2020 |
| WO | WO-2017/122278 A1 | 7/2017 |
| WO | WO-2018/198313 A1 | 11/2018 |
| WO | WO-2019/093197 A1 | 5/2019 |
| WO | WO-2020/136822 A1 | 7/2020 |
| WO | WO-2020/136832 A1 | 7/2020 |
| WO | WO-2020/153170 A1 | 7/2020 |
| WO | WO-2020/166350 A1 | 8/2020 |

OTHER PUBLICATIONS

Office Action issued in corresponding Japanese Patent Application No. 2020-214790 dated Mar. 30, 2021 with English translation (10 pages).
Office Action issued in corresponding Japanese Patent Application No. 2021-118486 dated Sep. 7, 2021 with English translation (9 pages).
US Notice of Allowance on U.S. Appl. No. 17/411,631 dated Jul. 17, 2023 (10 pages).

* cited by examiner

FLIGHT MANAGEMENT SYSTEM AND FLIGHT MANAGEMENT METHOD

CROSS-REFERENCE TO RELATED APPLICATION

The present application is a continuation of U.S. patent application Ser. No. 17/411,631 filed on Aug. 25, 2021, which claims the priority benefit of Japanese Patent Application No. 2020-214790 filed on Dec. 24, 2020, the subject matter of which is hereby incorporated herein by reference.

BACKGROUND OF THE INVENTION

1. Field of the Invention

The present invention relates to a flight management system and a flight management method used to manage the flight information of a flight vehicle.

2. Description of Related Art

Patent Document 1 (i.e., WO 2018/198313A1 or US 2020/0317335A1) discloses an unmanned aerial vehicle action plan creation system configured to create a flight path according to a flight object and a flight area for a flight vehicle such as a drone permitted to fly in the sky upon inputting the flight object and the flight area, thus controlling the flight of a flight vehicle according to the flight path.

To control the flight of a drone in a wide area, for example, engineers have been studying utilization of a drone specially designed to make communication using predetermined radio waves transmittable through mobile communication networks. However, the increasing number of drones flying in the sky may increase the amount of communication using radio waves, which may adversely affect telecommunications made by mobile phones on the ground. For this reason, it is possible to conceive of an idea of limiting the number of drones concurrently flying in the sky upon receiving an application from a user to use predetermined radio waves with the user's drone.

However, the system of Patent Document 1 may experience a problem due to time and effort needed for a user to fly a flight vehicle in the sky because the user needs to make an application to use predetermined radio waves with the flight device and to input the information of a flight path with the system.

The present invention is made to solve the aforementioned problem, and therefore the present invention aims to provide a flight management system and a flight management method, which can reduce time and effort needed for a user to fly a flight vehicle configured to make communication using predetermined radio waves.

SUMMARY OF THE INVENTION

In a first aspect of the present invention, a flight management system is configured to manage the flight of a flight vehicle in communication with a user terminal operated by a user. The flight management system includes a receiver configured to receive from the user terminal the flight application information including the identification information to identify the flight vehicle, a flight path preferred by the user to fly the flight vehicle, and a flight time preferred by the user to fly the flight vehicle; a determination unit configured to determine whether or not to permit utilization of predetermined radio waves with the flight vehicle to fly along the flight path at the flight time based on the flight application information; and a transmitter configured to transmit the flight information instructing the flight vehicle to fly along the flight path to the flight vehicle identified by the identification information on the condition that the determination unit determines to permit utilization of predetermined radio waves.

In the above, the determination unit may permit utilization of predetermined radio waves on the condition that the number of flight vehicles flying in a region encompassing at least part of the flight path at the flight time is equal to or less than a predetermined value.

The region is covered by a same base station configured to communicate with a plurality of flight vehicles.

Alternatively, the determination unit may permit utilization of predetermined radio waves on the condition that the flight path is included in a radio map indicating positions subjected to communication services using predetermined radio waves.

The radio map indicates a capacity/incapacity of the flight vehicle to perform communication using predetermined radio waves for each position and for each altitude of the flight vehicle.

When the receiver receives the flight application information including a periodical flight time allowing the flight vehicle to repeatedly fly along the flight path, the transmitter may transmit the flight information to the flight vehicle a predetermined time before the periodical flight time.

In addition, the transmitter may transmit to the user terminal the information describing a reason why the determination unit does not permit utilization of the predetermined radio waves on the condition that the determination unit determines not to permit utilization of predetermined radio waves.

When the receiver receives from the flight vehicle the performance information representing an actual flight path or an actual flight time of the flight vehicle, the determination unit may compare the performance information with the flight application information and determine whether or not the flight vehicle is deviated in terms of the flight path or the flight time, wherein the transmitter may transmit to the user terminal the information as to whether or not the flight vehicle is deviated in terms of the flight path or the flight time.

The flight management system may include a charging unit configured to determine an amount of payment claimed against the user based on at least one of a duration of the flight with the flight vehicle, a distance of the flight of the flight vehicle, the number of times the flight vehicle makes the flight, the number of flight vehicles each actually making the flight, and a type of the flight vehicle.

In a second aspect of the present invention, a flight management method is adapted to a flight management system configured to manage the flight of a flight vehicle in communication with a user terminal operated by a user. The flight management method includes the steps of: receiving from the user terminal the flight application information including the identification information to identify the flight vehicle, a flight path preferred by the user to fly the flight vehicle, and a flight time preferred by the user to fly the flight vehicle; determining whether or not to permit utilization of predetermined radio waves with the flight vehicle to fly along the flight path at the flight time based on the flight application information; and transmitting the flight information instructing the flight vehicle to fly along the flight path to the flight vehicle identified by the identification information upon determining to permit utilization of predetermined radio waves.

DETAILED DESCRIPTION OF THE EXEMPLARY EMBODIMENT

A flight management system and a flight management method according to the exemplary embodiment of the present invention will be described in detail with reference to the accompanying drawings, wherein the same parts are denoted by same reference signs; hence, repetitive descriptions thereof will be omitted here.

[Overview of Flight Management System 1]

Figure 1:
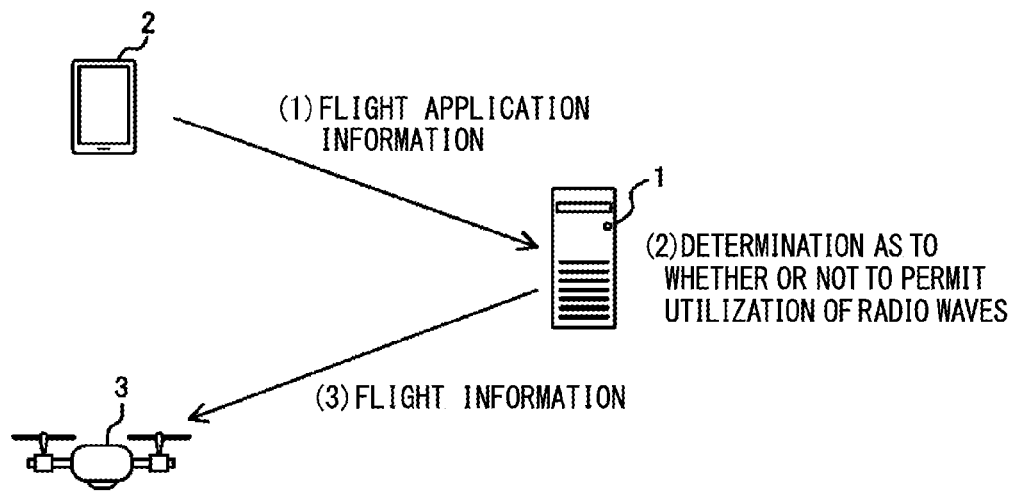
FIG. 1 is a schematic drawing diagrammatically showing a flight management system according to the exemplary embodiment of the present invention.

FIG. 1 is a schematic drawing diagrammatically showing a flight management system 1 according to the exemplary embodiment of the present invention, which is configured to communicate with a user terminal 2 and a flight vehicle 3 by radio. The flight management system 1 is made up of a computer system configured to receive from the user terminal 2 the flight application information relating to the flight of the flight vehicle 3 and to transmit to the flight vehicle 3 the flight information permitting the flight device 3 to fly in the sky. In this connection, the flight management system 1 can be realized using a single computing device or multiple computing devices. Alternatively, the flight management system 1 can be realized using a single virtual sever or multiple virtual servers operating on the cloud system providing a set of computer resources.

The user terminal 2 is made up of a computer device, e.g., an information processing terminal such as a smartphone, a tablet terminal, and a personal computer. A user is assumed as a person who may manipulate, manage, or possess the flight vehicle 3. In this connection, the user terminal 2 includes a display unit of a liquid-crystal display or the like configured to display various pieces of information and an operation unit such as a touch panel configured to receipt user's operations. The user terminal 2 is configured to receive or transmit various types of information with the flight management system 1 by way of radio communication.

The flight vehicle 3 is an unmanned aerial vehicle such as a drone configured to fly according to a flight path designated by a user in order to carry out predetermined operations. As operations performed by the flight vehicle 3, it is possible to mention transportation of objects along flight paths, capture of images around flight paths, discharge of objects (agricultural chemicals) along flight paths, and output of information (audio or optical information) along flight paths.

The outline of processes performed by the flight management system 1 according to the exemplary embodiment will be described below. The flight management system 1 is configured to receive from the user terminal 2 the flight application information (see (1) in FIG. 1) including the flight-vehicle identification information to identify the flight vehicle 3, a flight path preferred by a user who intends to fly the flight vehicle 3, and a flight time (i.e., a date and time of flight) preferred by a user who intends to fly the flight vehicle 3.

Based on the flight application information, the flight management system 1 may determine whether or not to permit utilization of predetermined radio waves when a user intends to fly the flight vehicle 3 at the flight time along the flight path (see (2) in FIG. 1). In this connection, the predetermined radio waves are available radio waves by which the flight vehicle 3 can communicate with the flight management system 1.

Upon satisfying a condition to permit utilization of radio waves, the flight management system 1 transmits to the flight vehicle 3 corresponding to the flight-vehicle identification information included in the flight application information the flight information allowing the flight vehicle 3 to fly along the flight path (see (3) in FIG. 1). In this connection, the flight information can be regarded as the information allowing the flight vehicle 3 to automatically fly along the flight path or the information supporting a user to fly the flight vehicle 3 along the flight path. During the flight of the flight vehicle 3 along the flight path, the flight vehicle 3 may communicate with the flight management system 1 using predetermined radio waves permitted thereto.

As described above, the flight management system 1 of the exemplary embodiment of the present invention is configured to determine whether or not to permit utilization of radio waves with the flight vehicle 3 upon receiving the flight application information relating to the flight of the flight vehicle 3 from the user terminal 2, thus allowing the flight vehicle 3 to fly in the sky according to the flight application information. This may eliminate the necessity for a user to make a setting of a flight path and an application to use radio waves separately. Accordingly, it is possible for a user to reduce time and effort to fly the flight vehicle 3 configured to make communication using predetermined radio waves.

[Configuration of Flight Management System 1]

Figure 2:
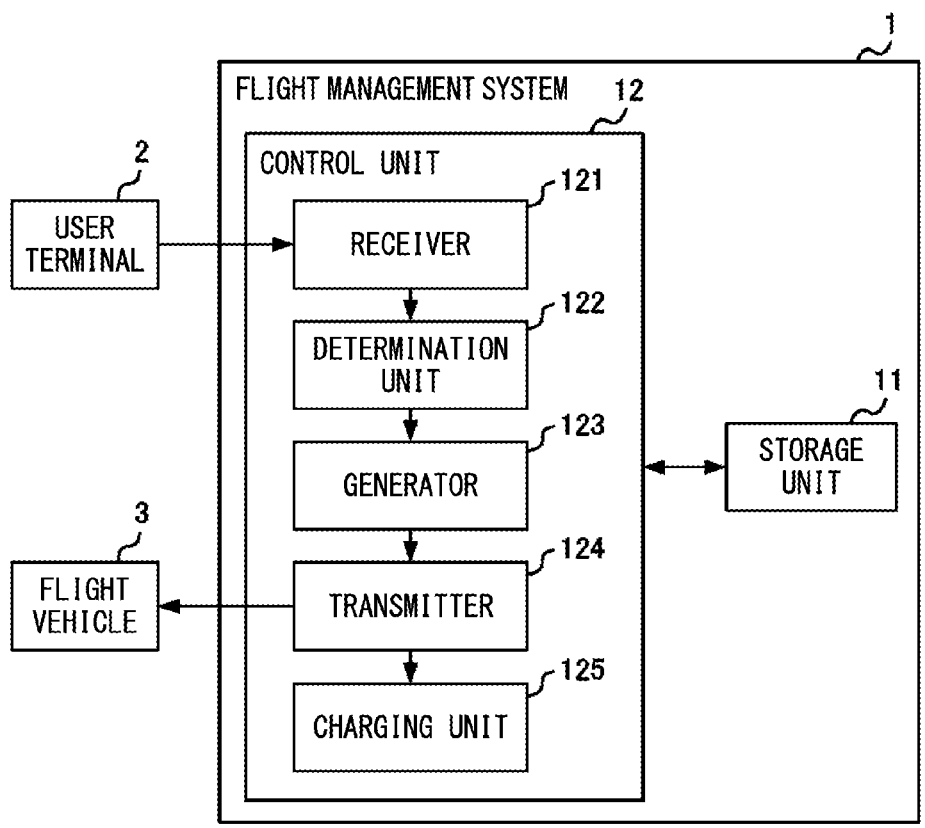
FIG. 2 is a block diagram of the flight management system according to the exemplary embodiment of the present invention.

FIG. 2 is a block diagram of the flight management system 1 according to the exemplary embodiment of the present invention. FIG. 2 includes symbols of arrows showing main flows of data between constituent elements, however, it is possible to employ other flows of data than flows of data shown in FIG. 2. FIG. 2 includes various blocks which may not necessarily be regarded as hardware units but can be regarded as functional units. For this reason, various blocks of FIG. 2 can be collectively embedded within a single device or separately embedded in multiple devices. In this connection, it is possible to transfer data between blocks through data buses or networks or by use of arbitrary means such as portable storage media.

The flight management system 1 includes a storage unit 11 and a control unit 12. The storage unit 11 is a storage media including ROM (Read-Only Memory), RAM (Random-Access Memory), hard-disk drives, or the like. The storage unit 11 is configured to store programs executed by the control unit 12 in advance. In addition, the storage unit 11 is configured to store the flight application information of the flight vehicle 3 received from the user terminal 2 as well as the charging information used to charge a user for management and communication with the flight vehicle 3.

The control unit 12 includes a receiver 121, a determination unit 122, a generator 123, a transmitter 124, and a charging unit 125. For example, the control unit 12 is a processor such as a CPU (Central Processing Unit), which may achieve functions of the receiver 121, the determination unit 122, the generator 123, the transmitter 124, and the charging unit 125 by executing programs stored on the storage unit 11. In this connection, various parts of the control unit 12 can be installed separately in multiple devices constituting the flight management system 1.

To achieve the processing of the exemplary embodiment of the present invention, the flight management system 1 needs to carry out a series of operations, which will be described below. The receiver 121 receives from the user terminal 2 the flight application information including the flight-vehicle identification information to identify the flight vehicle 3, the flight path preferred by a user who intends to fly the flight vehicle 3, and the flight time preferred by a user who intends to fly the flight vehicle 3.

Figure 3:
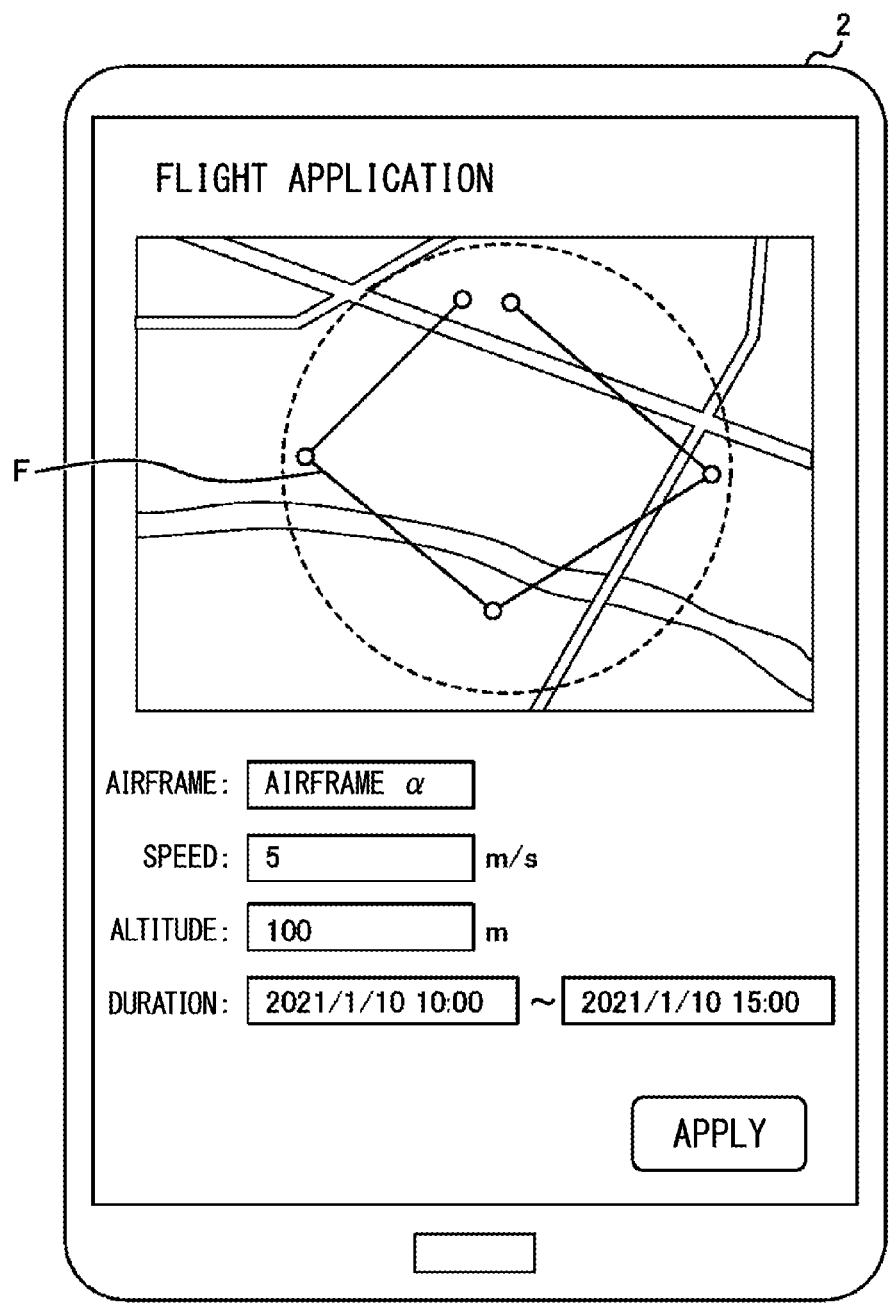
FIG. 3 is a screenshot showing the format of a flight application screen for accepting an input of flight application information with a user's terminal.

FIG. 3 is a screenshot showing the format of a flight application screen on the user terminal 2 to accept an input of the flight application information. The user terminal 2 awaits an input of a flight path F on the flight application screen. For example, the user terminal 2 may accept the flight path F as a linear path designated by a user on a map displayed on the flight application screen. Alternatively, the user terminal 2 may accept the flight path F including a flight-permitted region (e.g., a region encompassed by dotted curves in FIG. 3) designated by a user on a map and a linear path designated by a user within the flight-permitted region. Alternatively, the user terminal 2 may accept a three-dimensional flight path F including the position and the altitude of the flight vehicle 3. Specifically, the user terminal 2 awaits an input of a flight area serving as a flight-permitted region to be generated on a map. The flight management system 1 determines whether or not the flight area belongs to a radio map indicating communication-service positions, which will be described later. Upon determining that the flight area belongs to the radio map, the flight management system 1 stores on the storage unit 11 the flight area in association with the user identification information to identify a user of the user terminal 2. This makes it possible for the user terminal 2 to accept the flight path F designated in the flight area belonging to the radio map.

In addition, the user terminal 2 accepts an input of the flight-vehicle identification information of the flight vehicle 3 (having the airframe shown in FIG. 3), the speed of the flight vehicle 3 to fly in the sky, the altitude of the flight device 3 to fly in the sky, and the flight time (i.e., the duration shown in FIG. 3) of the flight vehicle 3 to fly in the sky on the flight application screen. The flight-vehicle identification information may be the information identifiable as an individual body of the flight vehicle 3 or the information identifiable as a type (or an airframe) of the flight vehicle 3. For example, the flight time indicates a duration defined between a flight-start time and a flight-end time.

Moreover, the user terminal 2 may accept an input of the radio device information relating to a radio device which the flight vehicle 3 uses to perform radio communication. For example, the radio device information may include the information representing the specification of an SIM (Subscriber Identify Module) installed in the flight vehicle 3 or the information representing a radio station installed in the flight vehicle 3.

In the flight management system 1, the receiver 121 is configured to receive the flight application information as the input information on the user terminal 2. The receiver 121 stores the flight application information received by the user terminal 2 on the storage unit 11 in association with the user identification information used to identify the user who may use the user terminal 2.

Based on the flight application information received by the receiver 121, the determination unit 122 determines whether or not to permit utilization of predetermined radio waves when the flight vehicle 3 flies along the flight path at the flight time. For example, radio waves are available radio waves which the flight vehicle 3 uses to perform communication and which belong to a frequency range allocated to a communication common carrier related to the flight management system 1. That is, the communication common carrier will determine whether or not to permit utilization of radio waves with respect to the flight vehicle 3 configured to perform communication using radio waves belonging to the frequency range allocated to the communication common carrier.

For example, the determination unit 122 may determine to permit utilization of radio waves on the condition that the number of flight vehicles 3, which may fly in a region including at least part of the flight path included in the flight application information at the flight time included in the flight application information, is equal to or lower than a predetermined value.

Figure 4:
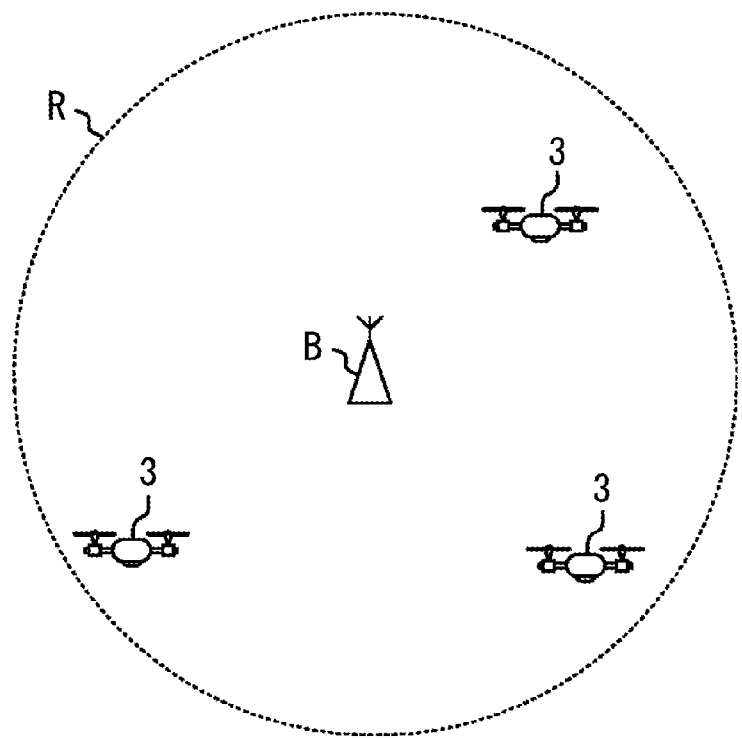
FIG. 4 is a schematic view showing a method how to calculate the number of flight vehicles with the determination unit of the flight management system.

FIG. 4 is a schematic view showing a method how to calculate the number of flight vehicles 3 with the determination unit 122 included in the control unit 12 of the flight management system 1. The determination unit 122 is configured to calculate the number of flight vehicles 3 which may fly in a region R including at least part of the flight path included in the flight application information at the flight time included in the flight application information, i.e., the number of flight vehicles 3 which may commonly share the same flight path and the same flight time. For example, the region R can be defined as a region in which one or multiple flight vehicles 3 perform communication using predetermined radio waves (i.e., radio waves subjected to determination of the determination unit 122) with a same base station B, in other words, a region in which a single base station B communicates with one or more flight vehicles 3 using predetermined radio waves. The storage unit 11 has stored the regional information representing the region R for each base station B.

Based on the regional information stored on the storage unit 11, the determination unit 122 extracts one or multiple base stations covering the flight positions based on the flight position information (representing positions plotted along the flight path in predetermined intervals of distance) corresponding to the flight path included in the flight application information received by the receiver 121. Subsequently, the determination unit 122 calculates the number of flight vehicles 3 which may fly in the sky while communicating with one or multiple base stations in the same time zone as the flight time included in the flight application information received by the receiver 121. FIG. 4 shows an example of the situation in which three flight vehicles 3 are flying at the same time in the region R associated with the base station B.

The determination unit 122 determines to permit utilization of radio waves when the number of flight vehicles 3, which is calculated for each region among one or multiple regions R identified by the determination unit 122, is equal to or less than a predetermined value (e.g., three), otherwise, the determination unit 122 determines not to permit utilization of radio waves. Thus, it is possible for the flight management system 1 to limit the number of flight vehicles 3 concurrently communicating with the base station B while reducing an impact applied to mobile phones which may communicate with the base station B on the ground.

The flight management system 1 may be an integrated system which integrates multiple common carries and which can be connected to multiple systems managed by multiple different common carries. In this case, the receiver 121 receives the flight application information including the flight time and the flight path from the user terminals 2 to be managed by multiple common carriers. According to the aforementioned method, the determination unit 122 calculates the number of flight vehicles 3 sharing the flight path and the flight time based on a plurality of flight application information given by multiple common carriers, thus determining whether or not the calculated number is equal to or less than a predetermined value.

In addition, the determination unit 122 may determine to permit utilization of radio waves on the condition that the radio map representing positions rendering communication services using radio waves encompasses the flight path included in the flight application information. In this connection, it is possible for the determination unit 122 to consider both or one of a first condition that the number of flight vehicles 3 concurrently flying in the same region is equal to or less than a predetermined value and a second condition that the radio map encompasses the flight path included in the flight application information.

Figure 5:
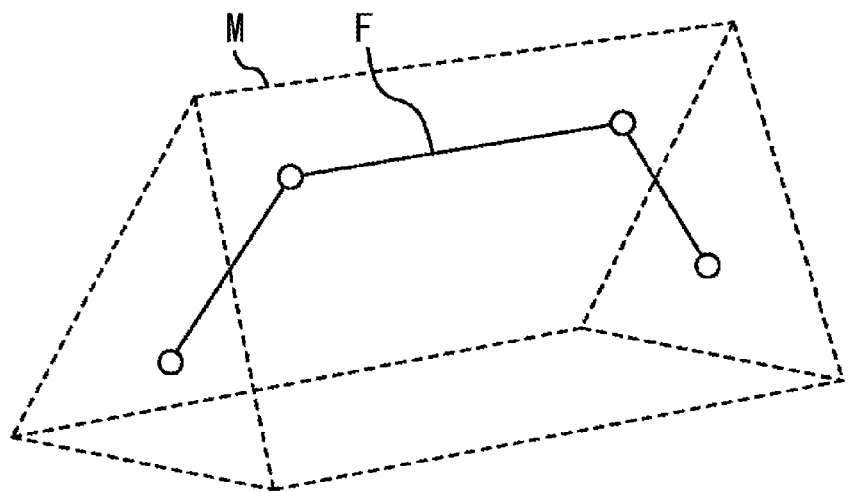
FIG. 5 is a schematic view showing a method how to determine whether a flight path is included in a radio map with the determination unit of the flight management system.

FIG. 5 is a schematic view showing a method as to whether or not a radio map M encompasses the flight path F with the determination unit 122. The radio map M is made up of the information representing whether or not the flight vehicle 3 is able to perform communication using predetermined radio waves (i.e., radio waves subjected to determination of the determination unit 122) for each position thereof and for each altitude thereof. For example, the radio map M is generated according to simulation of the capacity/incapacity of communication for each position/altitude or the radio-wave strength for each position/altitude. That is, the radio map M is expressed as a three-dimensional map showing an association between the position/altitude, the capacity/incapacity of communication, and/or the radio-wave strength. The storage unit 11 has stored the radio map M in advance.

The determination unit 122 compares each point of the flight path included in the flight application information with the radio map M stored on the storage unit 11. The determination unit 122 determines to permit utilization of radio waves when the radio map M encompasses each point of the flight path, otherwise, the determination unit 122 determines not to permit utilization of radio waves. Thus, it is possible for the flight management system 1 to confirm that the radio map M encompasses the flight path F which the user applied for, thus reducing a possibility of disconnecting communication using predetermined radio waves with the flight vehicle 3 during its flight.

The determination unit 122 may determine whether or not to permit utilization of predetermined radio waves according to another condition when the flight vehicle 3 flies along the flight path at the flight time. For example, the determination unit 122 may determine not to permit utilization of radio waves when a time length (or a duration) of the flight time included in the flight application information is equal to or greater than a predetermined value or when the duration of the flight time included in the flight application information includes a predetermined flight-inhibited time zone.

Alternatively, the determination unit 122 may determine whether or not to permit utilization of predetermined radio waves with the flight vehicle 3 according to the communication method and the frequency adaptable to a radio station installed in the flight vehicle 3. In this case, the determination unit 122 can determine the communication method and the frequency adaptable to the radio station of the flight vehicle 3 based on the information of the radio station included in the radio device information associated with the flight-vehicle identification information of the flight vehicle 3. For example, the communication method may be an LTE (Long Term Evolution) communication, a 5G communication, or the like. Subsequently, the determination unit 122 may determine to permit utilization of predetermined radio waves with the flight device 3 on the condition that the communication method and the frequency satisfy a predetermined condition (e.g., usability of the communication method and the frequency in the flight path). Accordingly, it is possible for the flight management system 1 to permit utilization of radio waves according to the communication method and the frequency adaptable to the radio station of the flight vehicle 3.

The generator 123 generates the flight information instructing the flight vehicle 3 to fly along the flight path included in the flight application information on the condition that the determination unit 122 determines to permit utilization of radio waves. For example, the flight information can be defined as the information instructing the flight vehicle 3 to automatically fly along the flight path. In this case, the flight information includes the flight time and the flight path along which the flight vehicle 3 may automatically fly.

The flight information may be the information supporting the user to fly the flight vehicle 3 along the flight path. In this case, the flight information includes the flight path along which the user manipulates the flight vehicle 3 to fly.

The transmitter 124 transmits the flight information generated by the generator 123 to the flight vehicle 3 corresponding to the flight-vehicle identification information included in the flight application information on the condition that the determination unit 122 determines to permit utilization of radio waves.

Figure 6:
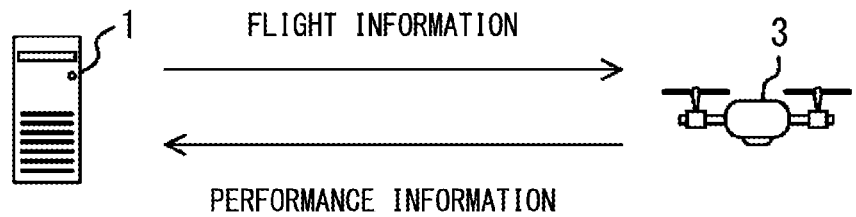
FIG. 6 is a schematic drawing showing the information transferred between the flight vehicle and the flight management system.

FIG. 6 is a schematic drawing showing the information transferred between the flight management system 1 and the flight vehicle 3. The flight vehicle 3 is configured to fly in the sky according to the flight information received from the flight management system 1. Upon receiving the flight information instructing the flight vehicle 3 to automatically fly along the flight path, the flight vehicle 3 is instructed to automatically fly along the flight path included in the flight information at the flight time included in the flight information.

Upon receiving the flight information supporting the user to fly the flight vehicle 3 along the flight path, the flight vehicle 3 may accept an input of a flight-start instruction to start its flight with the user terminal 2. Triggered by receiving the flight-start instruction from the user terminal 2, the flight vehicle 3 is instructed to fly along the flight path included in the flight information. In addition, the flight vehicle 3 may travel forward or backward along the flight path or stop in the air according to instructions received from the user terminal 2.

The flight vehicle 3 is able to perform communication using the permitted radio waves during its flight along the flight path. During progression of flight or after termination of flight, the flight vehicle 3 transmits to the flight management system 1 the flight-vehicle identification information (or an airframe ID) of the flight vehicle 3, the radio device information relating to the radio device used by the flight vehicle 3, and the performance information describing an actual path and an actual time for the flight vehicle 3 to fly in the air. In the flight management system 1, the receiver 121 receives the performance information from the flight vehicle 3 to store the performance information on the storage unit 11 in association with the flight-vehicle identification information.

Upon determining whether or not to permit utilization of radio waves based on the flight application information received from the user terminal 2, the flight management system 1 instructs the flight vehicle 3 to fly in the air. Accordingly, it is possible for the flight management system 1 to reduce time and effort for the user to fly the flight vehicle 3 configured to perform communication using predetermined radio waves.

When a trouble or failure occurs in a base station after the flight management system 1 permits utilization of predetermined radio waves with the flight vehicle 3, the flight management system 1 may revoke a permission to use radio waves with the flight vehicle 3. When a trouble or failure occurs in a base station which may possibly communicate with the flight vehicle 3 flying along the flight path, the transmitter 124 does not transmit the flight information to the flight vehicle 3. When the transmitter 124 has already transmitted the flight information to the flight vehicle 3, the transmitter 124 may transmit to the flight vehicle 3 an instruction to delete the flight information or the control information inhibiting the flight of the flight vehicle 3, or the transmitter 124 may transmit to the user terminal 2 a message to inhibit the flight of the flight vehicle 3. Accordingly, it is possible for the flight management system 1 to control the situation that the flight vehicle 3 cannot communicate with the base station during its flight.

In addition, the transmitter 124 may transmit to the user terminal 2 the information including a reason why the determination unit 122 does not permit utilization of radio waves according to the flight application information on the condition that the determination unit 122 does not permit utilization of radio waves. As reasons why the determination unit 122 does not permit utilization of radio waves, for example, it is possible to mention a status of the number of flight vehicles flying over the region R being equal to or greater than a predetermined value, a status of the flight path F not encompassed by the radio map M, a status of the duration of the flight time being equal to or greater than a predetermined value, and a status of the duration of the flight time including the predetermined flight-inhibiting time zone. Accordingly, the flight management system 1 notifies the user of a reason why the flight management system 1 does not permit the flight of the flight vehicle 3, and then the flight management system 1 may accept another flight application to fly the flight vehicle 3.

The charging unit 125 is configured to determine an amount of payment claimed against the user based on the performance information stored on the storage unit 11. For example, the charging unit 125 may calculate an amount of payment based on at least one of an actual time of the flight vehicle 3 making a flight, an actual distance of the flight vehicle 3 making a flight, the number of times the user makes applications, the number of times the flight vehicle 3 makes flights, the number of flight vehicles 3 making flights, and a type (or an airframe) of the flight vehicle 3. The charging unit 125 may change manners or equations of calculating payment according to the usage of the flight vehicle 3 making a flight such as a personal use, a corporative use, a transportation use, a monitoring use, and the like.

The charging unit 125 generates the charging information including its determined amount of payment and stores the charging information on the storage unit 11. In addition, the charging unit 125 may transmit the charging information to a charging server or the like used to claim payment against the user. Accordingly, it is possible for the flight management system 1 to charge payment to the user who may fly the flight vehicle 3 using the flight management system 1 according to the actual performance of flying the flight vehicle 3.

[Sequence of Flight Management Method]

Figure 7:
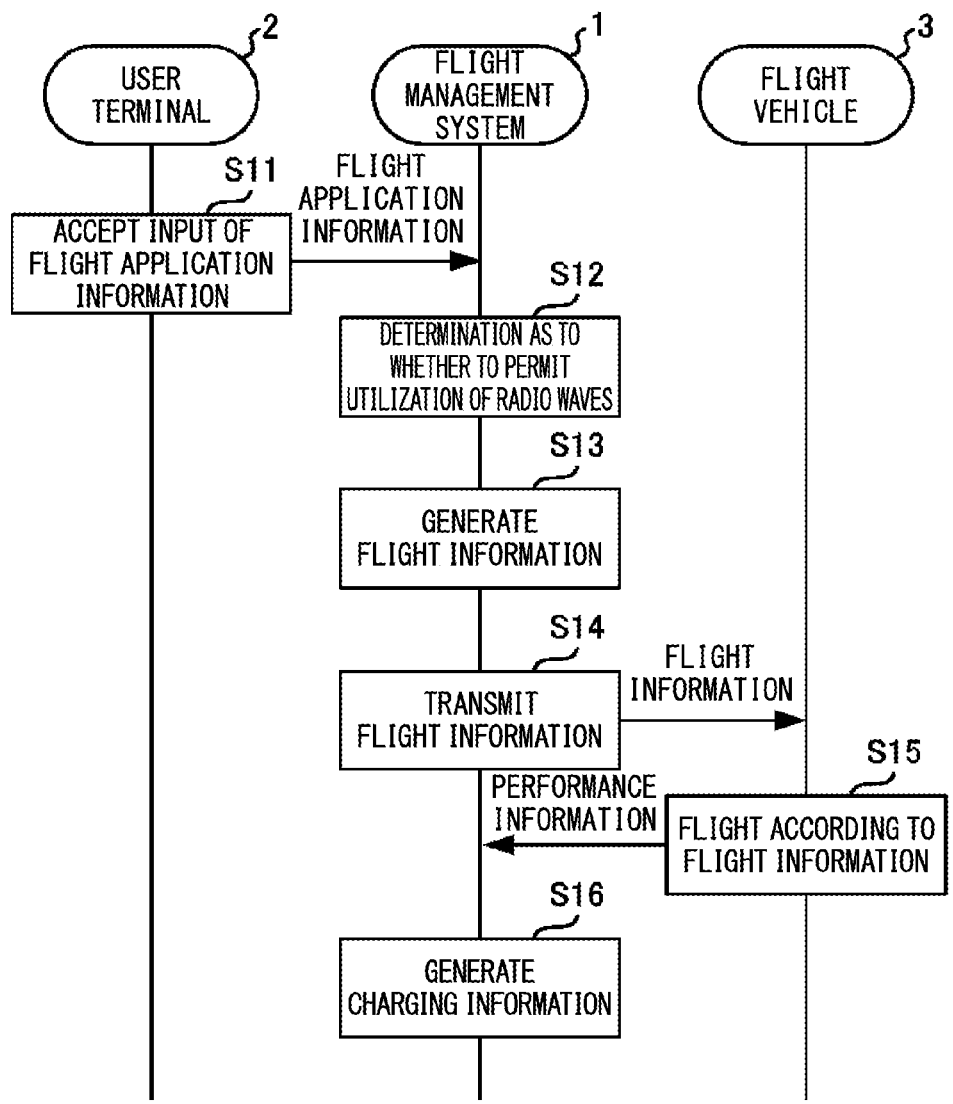
FIG. 7 is a sequence diagram showing a flight management method to be implemented by the flight management system.

FIG. 7 is a sequence diagram of a flight management method to be executed by the flight management system 1, which includes steps S11 through S16 to be implemented by the flight management system 1 in communication with the user terminal 2 and the flight vehicle 3. The user terminal 2 accepts an input of the flight application information on the flight application screen (S11). Specifically, the user terminal 2 inputs a flight area serving as a flight-permitted area to be generated on a map. The flight management system 1 determines whether or not the flight area is encompassed by the radio map representing positions subjected to communication services, which will be described later. Upon determining that the flight area is encompassed by the radio map, the flight management system 1 stores the flight area on the storage unit 11 in association with the user identification information used to identify a user of the user terminal 2. Subsequently, the user terminal 2 awaits an input of the flight path F inside the flight area which is determined to belong to the radio map.

The receiver 121 receives from the user terminal 2 the flight application information including the flight-vehicle identification information to identify the flight vehicle 3, the flight path preferred by the user who intends to fly the flight vehicle 3, and the flight time preferred by the user who intends to fly the flight vehicle 3.

Based on the flight application information received by the receiver 121, the determination unit 122 determines whether or not to permit utilization of radio waves when the flight vehicle 3 flies along the flight path at the flight time (S12). For example, the determination unit 122 determines to permit utilization of radio waves on the condition that the number of flight vehicles 3 which may fly in the region including at least part of the flight path included in the flight application information at the flight time included in the flight application information is equal to or less than a predetermined value. Alternatively, the determination unit 122 may determine to permit utilization of radio waves on the condition that the radio map representing positions subjected to communication services using radio waves encompasses the flight path included in the flight application information.

The generator 123 generates the flight information instructing the flight vehicle 3 to fly along the flight path included in the flight application information on the condition that the determination unit 122 permits utilization of radio waves (S13). For example, the flight information may be the information instructing the flight vehicle 3 to automatically fly along the flight path or the information supporting the user who may intend to fly the flight vehicle 3 along the flight path.

The transmitter transmits the flight information generated by the generator 123 to the flight vehicle 3 corresponding to the flight-vehicle identification information included in the flight application information on the condition that the determination unit 122 determines to permit utilization of radio waves (S14). The flight vehicle 3 may fly in the air based on the flight information received from the flight management system 1. During flight along the flight path, the flight vehicle 3 can perform communication using the permitted radio waves. During flight or after termination of flight, the flight vehicle 3 transmits the performance information, which includes an actual flight path and an actual flight time of the flight vehicle 3, to the flight management system 1 (S15)

In the flight management system 1, the receiver 121 receives the performance information from the flight vehicle 3 and stores the performance information on the storage unit 11 in association with the flight-vehicle identification information. The charging unit 125 determines an amount of payment claimed against the user based on the performance information stored on the storage unit 11. For example, the charging unit 125 calculates an amount of payment based on at least one of an actual flight time of the flight vehicle 3, an actual distance of the flight vehicle 3 flied in the air, the number of times the user makes applications, the number of times the flight vehicle 3 makes flights, the number of flight vehicles 3 actually flied in the air, and a type (or an airframe) of the flight vehicle 3. The charging unit 125 generates the charging information including its determined amount of payment and stores the charging information on the storage unit 11 (S16).

Advantageous Effects of Exemplary Embodiment

According to the exemplary embodiment, the flight management system 1 is configured to receive the flight application information including the flight path and the flight time of the flight vehicle 3 from the user terminal 2 and to thereby determine whether or not to permit utilization of radio waves based on the received flight application information. Subsequently, the flight management system 1 is configured to transmit to the flight vehicle 3 the flight information instructing the flight vehicle 3 to fly along the flight path upon determination to permit utilization of radio waves. This may eliminate the necessity of user's making a setting of the flight path and an application to use radio waves separately. Thus, it is possible for the flight management system 1 to reduce time and effort for the user to fly the flight vehicle 3 configured to perform communication using predetermined radio waves.

In this connection, due to development of favorable environments allowing drones to fly in urban areas and mountainous areas covered by radio networks, it is possible to contribute to Sustainable Development Goals (SDGs) initiated by the United Nations (UN), i.e., Goal 9 "Industry, Innovation and Infrastructure" and Goal 10 "Reduced Inequality".

First Variation

According to a first variation of the exemplary embodiment, the flight management system 1 is adapted to the flight vehicle 3 which the user intends to periodically fly along the same flight path. The flight management system 1 of the first example is designed to carry out a series of processes as follows.

The receiver 121 receives from the user terminal 2 the flight application information including a periodical flight time for the flight vehicle 3 to repeatedly fly along the flight path. For example, the periodical flight time is designated by a duration defined between a flight-start time and a flight-end time, which is combined with a time interval such as every day, every week, and every month.

Based on the flight application information received by the receiver 121, the determination unit 122 determines whether or not to permit utilization of predetermined radio waves by the flight vehicle 3 to fly along the flight path a predetermined time (e.g., one day) prior to the periodical flight time of the flight vehicle 3. That is, the determination unit 122 determines whether or not to permit utilization of radio waves every scheduled time before it comes to the scheduled time of the flight vehicle 3 to periodically make flight.

The generator 123 generates the flight information instructing the flight vehicle 3 to fly along the flight path included in the flight application information on the condition that the determination unit 122 determines to permit utilization of radio waves a predetermined time before the periodical flight time of the flight vehicle 3. The transmitter 124 transmits the flight information generated by the generator 123 to the flight vehicle 3 corresponding to the flight-vehicle identification information included in the flight application information on the condition that the determination unit 122 determines to permit utilization of radio waves a predetermined time before the periodical flight time of the flight vehicle 3.

This makes it possible for the user to periodically fly the flight vehicle 3 along the same flight path upon making one application. Accordingly, it is possible for the flight management system 1 to reduce time and effort of the user who may intend to repeatedly fly the flight vehicle 3 configured to make communication using predetermined radio waves.

Second Variation

According to a second variation of the exemplary embodiment, the flight management system 1 is characterized by determining whether or not the flight of the flight vehicle 3 is deviated from the flight path or the flight time indicated by the flight application information, thus making a feedback as to the determination result with the user terminal 2.

The determination unit 122 is configured to compare the flight application information stored on the storage unit 11 with the performance information which is stored on the storage unit 11 in association with the flight application information, thus determining whether or not the flight of the flight vehicle 3 is deviated from the flight path or the flight time. In this connection, the determination unit 122 may determine a deviation of the flight vehicle 3 in terms of the flight path or the flight time of the flight application information before the flight of the flight vehicle 3, during the flight of the flight vehicle 3, or after the flight of the flight vehicle 3. The determination unit 122 determines a deviation of the flight vehicle 3 from the flight path when a difference between the flight path of the flight application information and the actual flight path included in the performance information (e.g., a difference of geometrical contours therebetween) is equal to or above a predetermined value, otherwise, the determination unit 122 determines that no deviations occur in the flight path of the flight vehicle 3.

The transmitter 124 transmits to the user terminal 2 the information of the determination result as to whether or not the flight vehicle 3 is deviated in terms of the flight path or the flight time included in the flight application information. This makes it possible for the flight management system 1 to notify the user of the determination result as to whether or not the flight vehicle 3 is deviated in terms of the flight path and the flight time included in the flight application information, thus urging the user to observe the flight application information.

When the determination unit 122 determines a deviation of the flight vehicle 3 in terms of the flight path or the flight time included in the flight application information which was filed before or during the flight of the flight vehicle 3, in other words, when the flight of the flight vehicle 3 is delayed from the flight time or when the flight vehicle 3 is positionally deviated from the flight path, the transmitter 124 may transmit the attention attracting information to the user terminal 2 associated with the flight vehicle 3.

When the determination unit 122 determines a deviation of the flight vehicle 3 in terms of the flight path or the flight time included in the flight application information filed before the flight of the flight vehicle 3, it is possible to cancel a permission to utilize radio waves with the flight vehicle 3 before its flight. In this case, the transmitter 124 does not transmit the flight information to the flight vehicle 3. In addition, when the transmitter 124 already transmitted the flight information to the flight vehicle 3, the transmitter 124 should transmit to the flight vehicle 3 an instruction to delete the flight information or the control information for inhibiting the flight vehicle 3 to fly in the air. Alternatively, the transmitter 124 may transmit to the user terminal 2 a message to inhibit the flight of the flight vehicle 3. Accordingly, it is possible for the flight management system 1 to urge the user to observe the flight application information.

Third Variation

According to a third variation of the exemplary embodiment, the flight management system 1 is characterized by controlling power of the flight vehicle 3 for transmitting radio waves to a base station in addition to controlling the flight of the flight vehicle 3 according to the flight application information. The generator 123 generates the power control information to control power of the flight vehicle 3 for transmitting radio waves to a base station on the condition that the determination unit 122 determines to permit utilization of radio waves. For example, the power control information is the information instructing the flight vehicle 3 to control power of transmitting radio waves at the flight time.

The transmitter 124 transmits the power control information generated by the generator 123 to the flight vehicle 3 corresponding to the flight-vehicle identification information included in the flight application information on the condition that the determination unit 122 determines to permit utilization of radio waves. Based on the power control information received from the flight management system 1, the flight vehicle 3 adjusts the power of transmitting radio waves to a base station during its flight to fly along the flight path. Thus, it is possible for the flight management system 1 to control the power of the flight vehicle 3 at the flight time, thus controlling interference with a base station, located in the neighborhood of the flight path, due to communication of the flight vehicle 3.

The flight management system 1, the user terminal 2, and the flight vehicle 3 include processors each of which may serve as a subject of executing various steps (or various processes) included in the flight management method shown in FIG. 7. That is, each of the processors included in the flight management system 1, the user terminal 2, and the flight vehicle 3 is configured to read programs used to execute the flight management method of FIG. 7 from storage media and to achieve the flight management method of FIG. 7 by executing programs. In this connection, it is possible to partly omit the foregoing steps included in the flight management method of FIG. 7 or to arbitrarily change the order of the foregoing steps. Alternatively, it is possible to carry out a plurality of steps in parallel.

Heretofore, the present invention has been described by way of the foregoing embodiments (e.g., the exemplary embodiment and its variations), wherein the technical scope of the invention is not necessarily limited to the foregoing embodiments; hence, it is possible to create and introduce any other variations and modifications within the subject matter of the invention. For example, it is possible to physically or functionally disperse or integrate part or entirety of the foregoing devices in arbitrary units of components. In addition, the present invention may embrace any new examples produced by arbitrarily combining the foregoing embodiments. It can be said that new examples produced by combinations of the foregoing embodiments will offer the same advantageous effects as the exemplary embodiment.

Lastly, the present invention can be modified in various ways within the scope of the invention as defined in the appended claims. In this connection, the foregoing embodiments are each adapted to the flight vehicle 3 such as a drone configured to communicate with the flight management system 1 by radio; however, it is possible to employ any other devices serving as the flight vehicle 3 either a manned flying device or an unmanned flying device equipped with a communication module to wirelessly communicate with a flight management server or the like such as the flight management system 1.

While the preferred embodiment of the present invention has been described and illustrated above, it should be understood that the preferred embodiment is exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A flight management system comprising:
a memory configured to store instructions; and
a processor configured to execute the instructions to:
receive, from a terminal used by a user, area information indicating a flight area, which is generated on the terminal, serving as a flight-permitted area by a flight vehicle;
determine whether or not the received flight area is a communication area in which communication is possible;
store, in the memory, the area information and user identification information used to identify the user of the terminal, in a case where the received flight area is determined to be the communication area in which communication is possible;
receive from the terminal, after the flight area is determined to be the communication area, path information including the flight path preferred by the user to fly the flight vehicle, which is specified within the flight area determined to be the communication area at the terminal, and store the path information in the memory in association with the user identification information; and transmit, to the flight vehicle, flight information controlling the flight vehicle to automatically fly along the flight path.

2. The flight management system according to claim 1, wherein the path information includes, in addition to the flight path, a flight time preferred by the user to fly the flight vehicle, and the processor is configured to execute the instructions to transmit, to the flight vehicle, power control information for controlling power of the flight vehicle for transmitting radio waves to a base station at the flight time.

3. The flight management system according to claim 1, wherein the path information includes, in addition to the flight path, a flight time preferred by the user to fly the flight vehicle, and the processor is configured to execute the instructions to:

receive performance information including an actual flight path and an actual flight time of the flight vehicle in addition to the path information; and determine whether or not the flight vehicle has deviated from the flight path or the flight time by comparing the path information with the performance information.

4. The flight management system according to claim 1, wherein the path information includes, in addition to the flight path, flight vehicle identification information for identifying the flight vehicle, and a flight time preferred by the user to fly the flight vehicle, and the processor is configured to execute the instructions to:

determine, based on the path information, whether or not permit utilization of predetermined radio waves when the flight vehicle corresponding to the flight vehicle identification information flies at the flight time along the flight path; and transmit, to a terminal used by the user, information including a reason for not permitting the utilization of the predetermined radio waves on a condition that the determination unit determines that the utilization of the predetermined radio waves is not permitted.

5. The flight management system according to claim 4, wherein the processor is configured to execute the instructions to transmit, to the flight vehicle corresponding to the flight vehicle identification information, the flight information for flying the flight vehicle along the flight path, on a condition that the determination unit determines that the utilization of the predetermined radio waves is permitted.

6. A system comprising:

a terminal used by a user; and a flight management system capable of communicating with the terminal, wherein the terminal is configured to transmit, to the flight management system, area information indicating a flight area, which is generated on the terminal, serving as a flight-permitted area by a flight vehicle, and the flight management system comprises:

a memory configured to store instructions; and a processor configured to execute the instructions to:

receive, from the terminal used by the user, the area information indicating the flight area;

determine whether or not the received flight area is a communication area in which communication is possible;

store, in the memory, the area information and user identification information used to identify the user of the terminal, in a case where the received flight area is determined to be the communication area in which communication is possible; and receive from the terminal, after the flight area is determined to be the communication area, path information including the flight path preferred by the user to fly the flight vehicle, which is specified within the flight area determined to be the communication area at the terminal, and store the path information in the memory in association with the user identification information; and transmit, to the flight vehicle, flight information controlling the flight vehicle to automatically fly along the flight path.

7. A terminal capable of communicating with a flight management system for managing information on a flight of a flight vehicle, the terminal comprising:

a memory configured to store instructions; and a processor configured to execute the instructions to:

transmit, to the flight management system, area information indicating a flight area, which is generated on the terminal, serving as a flight-permitted area by the flight vehicle;

accept, after the transmitted flight area is determined to be the communication area in the flight management system, path information including the flight path preferred by the user to fly the flight vehicle, which is specified within the flight area determined to be the communication area; and transmit the path information to the flight management system and cause the flight management system to transmit, to the flight vehicle, flight information controlling the flight vehicle to automatically fly along the flight path.

8. A flight management method executed by a processor, the flight management method comprising:

receiving, from a terminal used by a user, area information indicating a flight area, which is generated on the terminal, serving as a flight-permitted area by a flight vehicle;

determining whether or not the received flight area is a communication area in which communication is possible;

storing, in a memory, the area information and user identification information used to identify the user of the terminal, in a case where the received flight area is determined to be the communication area in which communication is possible;

receiving, from the terminal, after the flight area is determined to be the communication area, path information including the flight path preferred by the user to fly the flight vehicle, which is specified within the flight area determined to be the communication area at the terminal, and storing the path information in the memory in association with the user identification information; and transmit, to the flight vehicle, flight information controlling the flight vehicle to automatically fly along the flight path.

9. The flight management system according to claim 1, wherein
- in the determining, it is determined whether or not the received flight area is included in the communication area including information of position and altitude; and
- in the receiving, the path information including the flight path including information of the position and altitude is received.

10. The flight management system according to claim 1, wherein the processor is configured to execute the instructions to receive from the terminal, in addition to the path information, a speed of the flight vehicle to fly.

* * * * *